Patented Aug. 31, 1948

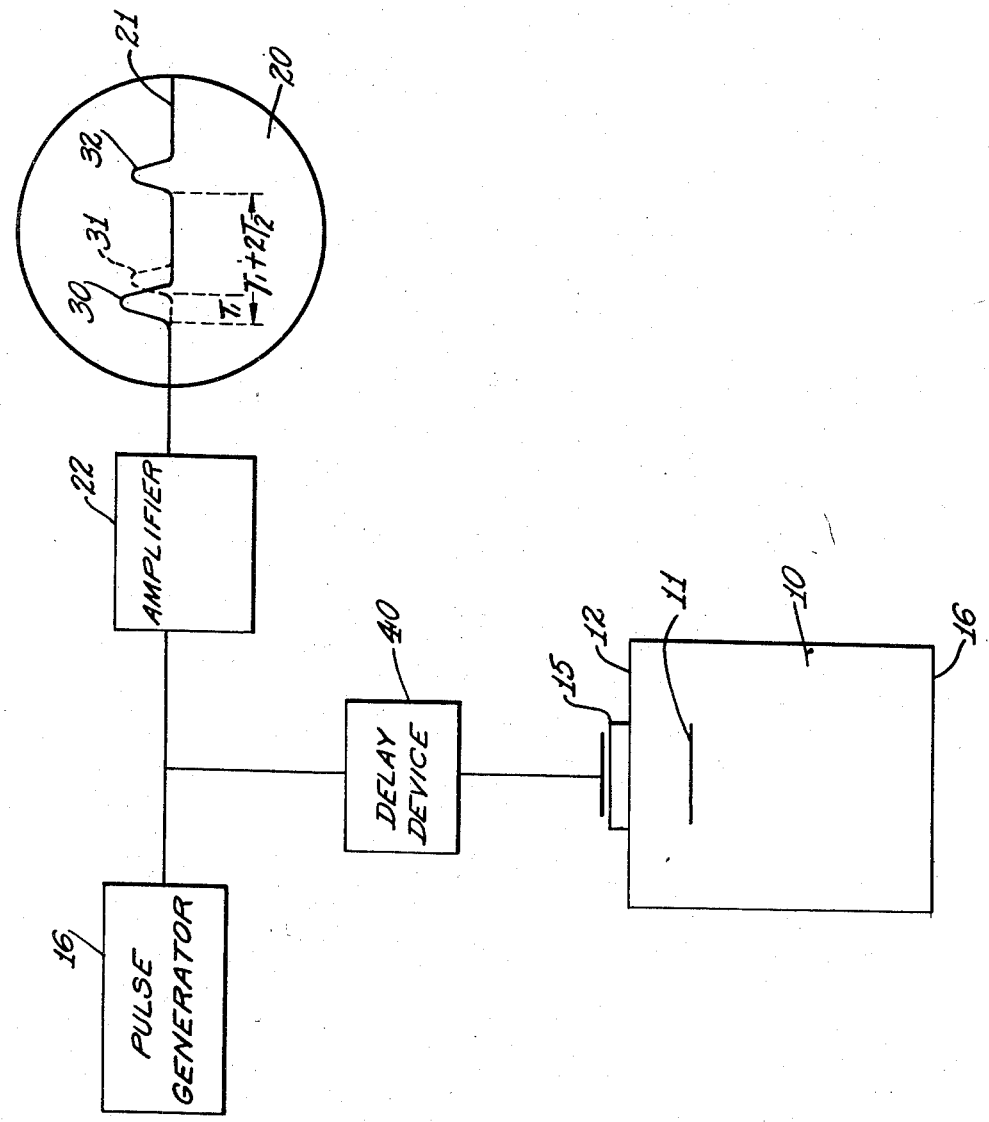

2,448,399

UNITED STATES PATENT OFFICE 2,448,399

SUPERSONIC INSPECTION

Vincent G. Shaw, Pittsburgh, Pa., assignor to Sperry Products, Inc., Hoboken, N. J., a corporation of New York Application June 1, 1946, Serial No. 673,723

2 Claims. (Cl. 73—67)

This invention relates to the inspection of material for defects or for the purpose of determining thickness by means of supersonic wave trains which are transmitted into the material under test and determining the time interval between the transmission of the pulse and the reception of its reflection from a reflecting surface within the material, said surface being the surface of a defect or the surface of the material opposite the surface through which the pulse enters. One such system is disclosed in the patent to Floyd A. Firestone, No. 2,280,226, granted April 21, 1942. In such systems it is customary to apply the wave train to an electro-mechanical transducer in contact with the material to transmit the wave train into the material and to receive reflections of the wave train either by the same electro-mechanical transducer or by a separate transducer. The received reflections are amplified by a thermionic amplifier whose output is then applied to a suitable indicator such as an oscilloscope where the output of the amplifier is caused to provide vertical deflection of a horizontal sweep.

When a single electro-mechanical transducer is utilized for both transmitting the pulses and receiving reflections therefrom a problem arises due to the fact that the original pulse which is applied to the transducer is applied at the same time to the amplifier. The original pulse, being of relatively high voltage, tends to overload the amplifier and it requires an appreciable time for the amplifier to regain its sensitivity. If the received reflections arrive at the amplifier before the amplifier has had an opportunity to regain its sensitivity, the indication of the reflected pulses will be merged with the indication caused by the original pulse. This is particularly true in those cases where the reflecting surface lies close to the surface through which the original pulse enters.

It is one of the principal objects of this invention, therefore, to provide a method and means whereby the reflected pulse may be rendered distinct from the original pulse even in those cases where the reflecting surface lies close to the entering surface of the material under test.

It is a further object of this invention to provide a delay device suitably positioned in the above described testing system which will delay the indication of the reflected pulse for a predetermined time interval after the transmission of the original pulse.

Further objects and advantages of this invention will become apparent in the following detailed description thereof.

The accompanying drawing is a diagrammatic illustration of one embodiment of this invention.

Referring to the drawing, there is shown a work-piece 10 consisting of a mass of material which it is desired to test either for defects such as fissures 11 within the material or for determining the thickness of the material. For this purpose a pulse of high frequency is adapted to be transmitted into the work-piece 10 through an entering surface 12 by means of a piezo-electric element, such as quartz crystal 15, which is adapted to be energized by a pulse generator 16 designed to generate wave trains or pulses of high frequency, usually on the order of one megacycle or more. The wave train travels into the work-piece and will be reflected from any reflecting surface such as the surfaces of flaw 11 or the opposite surface 16 of the work-piece 10. The time interval which elapses between the transmission of the pulse and the reception of its reflection from a reflecting surface is a measure of the distance of the reflecting surface below the entering surface 12. Such time interval may be indicated on a suitable indicator such as an oscilloscope 20 having a horizontal sweep 21 which is designed to be varied in a vertical direction by applying the output from an amplifier 22 to the vertical plates of the oscilloscope. The amplifier 22 is connected to both the pulse generator and the transducer 15 in order that a single transducer may be used for transmitting and receiving.

As stated in the introduction hereto, the pulse generator places a high voltage signal on the input of the amplifier which tends to overload it so that the amplifier requires a predetermined time within which to regain its sensitivity. If the reflecting surface is close to the entering surface 12, reflections of the pulse will be received at the amplifier before the amplifier has regained its sensitivity. Thus, if the initial pulse produces an indication 30 on the oscilloscope, the reflections of the pulse from a reflecting surface near the entering surface might produce an indication 31 shown in dotted lines which would merge with the indication 30 and be indistinguishable therefrom.

The method which is here employed to distinguish between the indication of the original pulse and the indication due to reflections of the pulse consists in providing a delaying device between the pulse generator 16 and the transducer 15 so that the pulse transmitted to the transducer will be delayed in reaching the transducer and the reflections of the pulse received by the transducer will be delayed a similar time interval in reaching the amplifier. The time delay induced by the delay device 40 may be so chosen as to insure that reflections received from the work-piece 10, even when the reflecting surfaces are close to the entering surface 12, will arrive at the amplifier 22 after the amplifier has regained its sensitivity. Thus the reflection of the pulse will appear as an indication 32 spaced substantially from indication 30. By reference to the oscilloscope diagram, it will be seen that, if it takes the pulse a time interval $T_1$ to travel from surface 12 to a reflecting surface and back to the transducer, such time interval $T_1$ is not sufficient to space the indication 31 from the indication 30 sufficiently to distinguish said indications. However, with the introduction of delay device 40 which introduces a time delay $T_2$, it will be seen that the time interval between the beginning of the initial pulse and the beginning of the reflection, in other words, between the beginning of indications 30 and 32, will be time interval $T_1 + 2T_2$. This time interval is sufficient to separate clearly the indication 32 due to the reflected pulse from the indication 30 due to the initial pulse.

The type of time delay 40 which is employed may be a simulated artificial transmission line consisting of lumped constants in the form of a plurality of capacitors and inductances. However, other types of electrical delay networks may be substituted therefor.

The foregoing description of the invention is merely illustrative and changes may be made within the scope of the appended claims.

Having described my invention, what I claim and desire to secure by Letters Patent is:

1. A device for inspecting an object, comprising, in combination, a pulse generator, means for transmitting the pulse into the object and receiving reflections of the pulse coming out of the object, an amplifier, means for applying the pulse from the generator directly to the amplifier, means for applying the reflected pulse from the transmitting and receiving means to the amplifier, means for indicating the output from the amplifier, time delay means between the pulse generator and the transmitting and receiving means and between the transmitting and receiving means and the amplifier.

2. A device for inspecting an object, comprising, in combination, an electric pulse generator, an electro-mechanical transducer energized by the generator for applying a supersonic pulse to the object and for receiving reflections of the supersonic pulse coming out of the object, said transducer being adapted to generate an electric pulse in response to reflections of the supersonic pulse from the object, an amplifier, means for applying the pulse from the generator directly to the amplifier, means for applying a reflected pulse from the transducer to the amplifier, means for indicating the output from the amplifier, and time delay means between the pulse generator and the transducer and between the transducer and the amplifier.

VINCENT G. SHAW.

REFERENCES CITED

The following references are of record in the file of this patent:

UNITED STATES PATENTS

| Number | Name | Date |
|---|---|---|
| 2,280,226 | Firestone | Apr. 21, 1942 |
| 2,415,981 | Wolff | Feb. 18, 1947 |
| 2,419,576 | Levy | Apr. 29, 1947 |